Oct. 11, 1960       L. G. S. BROOKER ET AL       2,955,939
      HOLOPOLAR CYANINE DYES AND PHOTOGRAPHIC
              EMULSIONS CONTAINING THEM
                  Filed Sept. 13, 1956

*Fig. 1*

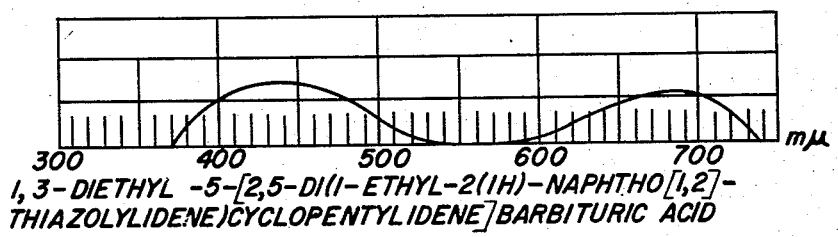

1,3-DIETHYL -5-[2,5-DI(I-ETHYL-2(IH)-NAPHTHO[1,2]-
THIAZOLYLIDENE)CYCLOPENTYLIDENE]BARBITURIC ACID

*Fig. 2*

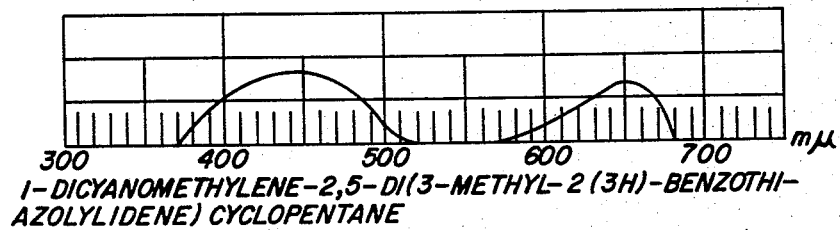

I-DICYANOMETHYLENE-2,5-DI(3-METHYL-2(3H)-BENZOTHI-
AZOLYLIDENE) CYCLOPENTANE

*Fig. 3*

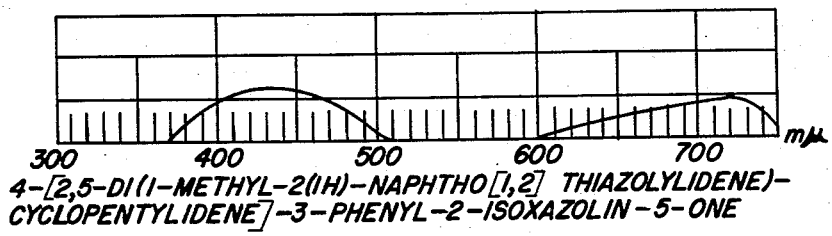

4-[2,5-DI(I-METHYL-2(IH)-NAPHTHO[1,2] THIAZOLYLIDENE)-
CYCLOPENTYLIDENE]-3-PHENYL-2-ISOXAZOLIN-5-ONE

LESLIE G. S. BROOKER
                FRANK L. WHITE
                    INVENTORS

BY
                      ATTORNEYS

United States Patent Office 2,955,939
Patented Oct. 11, 1960

2,955,939

HOLOPOLAR CYANINE DYES AND PHOTOGRAPHIC EMULSIONS CONTAINING THEM

Leslie G. S. Brooker and Frank L. White, Rochester, N.Y., assignors to Eastman Kodak Company, Rochester, N. Y., a corporation of New Jersey Filed Sept. 13, 1956, Ser. No. 609,525

6 Claims. (Cl. 96—105)

This invention relates to holopolar cyanine dyes, a method for making such dyes, and photographic silver halide emulsions spectrally sensitized with such dyes.

It is, therefore, an object of our invention to provide new holopolar cyanine dyes. Another object is to provide a method for making these new dyes. Still another object is to provide photographic silver halide emulsions spectrally sensitized with the new holopolar cyanine dyes of our invention. Other objects will become apparent from a consideration of the following description and examples.

The new holopolar cyanine dyes of our invention comprise those dyes represented by the following two general formulas:

(I)
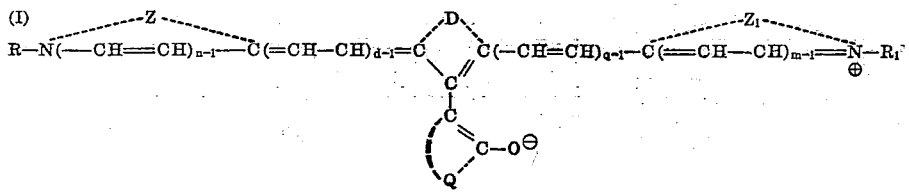

and (II)
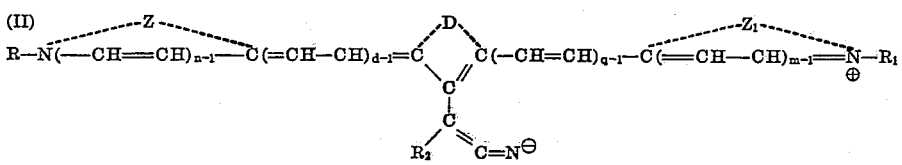

wherein R and $R_1$ each represents a substituted or unsubstituted alkyl group (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, etc.) (especially alkyl groups containing from 1 to 4 carbon atoms), $R_2$ represents a cyano group or an alkoxycarbonyl group (methoxycarbonyl, ethoxycarbonyl, etc., especially a lower alkoxycarbonyl group), $d$, $m$, $n$ and $q$ each represents a positive integer of from 1 to 2, D represents the atoms necessary to complete a cyclopentene or cyclohexene ring, Q represents the non-metallic atoms necessary to complete a nucleus of the indandione series (e.g., 1,3-diketohydrindene, etc.) or a heterocyclic nucleus containing from 5 to 6 atoms in the heterocyclic ring, such as those of the pyrazolone series (e.g., 3-methyl-1-phenyl-5-pyrazolone, 1-phenyl-5-pyrazolone, 1-(2-benzothiazolyl)-3-methyl-5-pyrazolone, etc.), those of the isoxazolone series (e.g., 3-phenyl-5(4H)-isoxazolone, 3-methyl-5(4H)-isoxazolone, etc.), those of the oxindole series, (e.g., 1-alkyl-2,3-dihydro-2-oxindoles, etc.), those of the 2,4,6-triketohexahydropyrimidine series (e.g., barbituric acid or 2-thiobarbituric acid as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di(β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc.) or 1-alkyl-3-aryl (e.g., 1-ethyl-3-phenyl, 1-n-heptyl-3-phenyl, etc.) derivatives), those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2(3H)-imidazo[1,2-a]-pyridone series, those of the 5,7-dioxo-6,7-dihydro-5-thiazolo[3,2-a]pyrimidine series (e.g., 5,7-dioxo-3-phenyl-6,7-dihydro-5-thiazolo[3,2-a]pyrimidine, etc.), those of the 2-thio-2,4-oxazolidinedione series (i.e., those of the 2-thio-2,4(3H,5H)-oxazoledione series) (e.g., 3-ethyl-2-thio-2,4-oxazoledinedione, etc.), those of the thianaphthenone series (e.g., 3(2H)-thianaphthenone, etc.), those of the 2-thio-2,5-thiazolidinedione series (i.e., the 2-thio-2,5(3H,4H)-thiazoledione series) (e.g., 3-ethyl-2-thio-2,4-oxazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-α-naphthyl-2,4-thiazolidinedione, etc.), those of the thiazolidinone series (e.g., 4-thiazolidinone, 3-ethyl-4-thiazolidinone, 3-phenyl-4-thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2,4-imidazolinedione (hydantoin) series (e.g., 2,4-imidazolinedione, 3 - ethyl - 2,4 - imidazolinedione, 3 - phenyl - 2,4-imidazolinedione, 3-α-naphthyl-2,4-imidazolinedione, 1,3-diethyl-2,4-imidazolinedione, 1-ethyl-3-α-naphthyl-2,4-imidazolinedione, 1,3 - diphenyl - 2,4 - imidazolinedione, etc.), those of the 2-thio-2,4-imidazolinedione (i.e., 2-thiohydantoin) series (e.g., 2-thio-2,4-imidazolinedione, 3-ethyl-2-thio-2,4-imidazolinedione, 3-phenyl-2-thio-2,4-imidazolinedione, 3-α-naphthyl-2-thio-2,4-imidazolinedione, 1,3-diethyl-2-thio-2,4-imidazolinedione, 1 - ethyl-3-phenyl - 2-thio - 2,4 - imidazolinedione, 1 - ethyl - 3 - α - naphthyl - 2-thio-2,4-imidazolinedione, 1,3-diphenyl-2-thio-2,4-imidazolinedione, etc.), those of the 5-imidazolinone series (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom), and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole etc.), those of the naphthothiazole series (e.g., naphtho[1,2]thiazole, naphtho[2,1]thiazole, 5 - methoxynaphtho-[2,1]thiazole, 5 - ethoxynaphtho[2,1]thiazole, 8 - methoxynaphtho[1,2]thiazole, 7 - methoxynaphtho[1,2]thiazole, etc.), those of the thianaphtheno-7′,6′,4,5-thiazole series (e.g., 4′-methoxythianaphtheno-7′,6′,4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-methylbenzoxazole, 5-phenylbenzoxazole, 5,6-dimethylbenzoxazole, 4,6 - dimethylbenzoxazole, 5 - methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphtho[1,2]oxazole, naphtho[2,1]oxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the benzimidazole series (e.g., 1,3-diethylbenzimidazole, 1-ethyl-3-phenylbenzimidazole, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 5-methylpyridine, etc.), those of the 4-pyridine series (e.g., pyridine, etc.), etc.

The effects of the new holopolar cyanine dyes of our invention in photographic emulsions are graphically illustrated in the accompanying drawing which is explained in greater detail below.

The holopolar cyanine dyes represented by Formula I above can advantageously be prepared by condensing a compound selected from those represented by the following general formula:

(III)

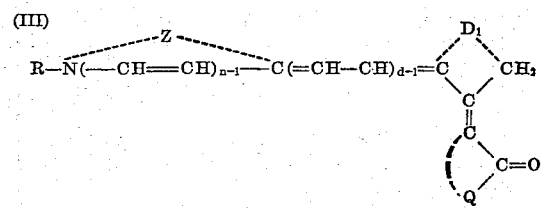

wherein R, $n$, $d$, Q and Z each have the values given above, and $D_1$ represents the atoms necessary to complete a cyclopentane or cyclohexane ring, together with a cyclammonium quaternary salt selected from those represented by the following general formula:

(IV)

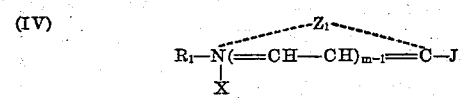

wherein $R_1$, $m$ and $Z_1$ each have the values given above,

X represents an acid radical, such as chloride, bromide, iodide, perchlorate, thiocyanate, benzenesulfonate, p-toluenesulfonate, methylsulfate, ethylsulfate, etc., and J represents an electronegative group, such as:

(IVa)     —S—R_3

wherein $R_3$ represents an alkyl group (e.g., methyl, ethyl, etc.) or an aryl group (e.g., phenyl, tolyl, etc.), or:

(IVb)

wherein $R_4$ represents an acyl group (e.g., acetyl, propionyl, butyryl, benzoyl, etc.) and $R_5$ represents an aryl group (e.g., phenyl, tolyl, etc.).

The holopolar cyanine dyes represented by Formula II above can be prepared advantageously by condensing a compound selected from those represented by the following general formula:

(V)

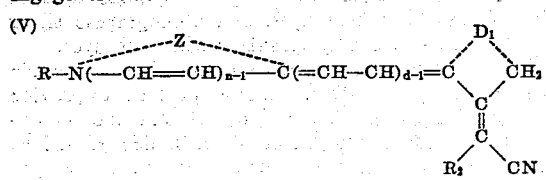

wherein R, $R_2$, $d$, $n$, $D_1$ and Z each have the values given above, together with a cyclammonium quaternary salt selected from those represented by Formula IV above.

Alternatively, the holopolar cyanine dyes selected from those represented by Formula I above can be prepared in a single step by condensing two molecular equivalents of a cyclammonium quaternary salt selected from those represented by Formula IV above with one molecular equivalent of an intermediate selected from those represented by the following general formula:

(VI)

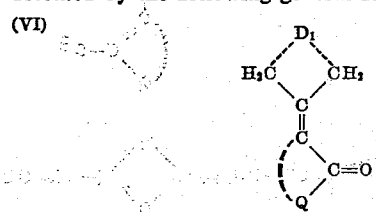

wherein Q and $D_1$ each have the values given above. In like manner, the holopolar cyanine dyes selected from those represented by Formula II above can be prepared by condensing two molecular equivalents of a cyclammonium quaternary salt selected from those represented by Formula IV above with an intermediate selected from those represented by the following general formula:

(VII)

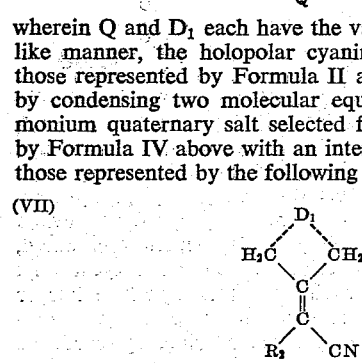

wherein $R_2$ and $D_1$ each have the values given above. The intermediates selected from those represented by Formulas III and VI above can advantageously be prepared according to the method described in our application Serial No. 609,524, filed on even date. The intermediates selected from those represented by Formulas V and VII can be prepared according to the method described in Jones U.S. application Serial No. 586,053, filed May 21, 1956, (now U.S. Patent No. 2,852,385, issued September 16, 1958) or British Patent 704,840.

The condensations of the intermediates of Formulas III, V, VI and VII with the compounds of Formula IV can be accelerated by basic condensing agents, such as the trialkylamines (e.g., triethylamine, tri-n-propylamine, triisopropylamine, tri-n-butylamine, etc.), N,N-dialkylanilines (e.g., N,N-dimethylaniline, N,N-diethylaniline, etc.), N-alkylpiperidines (e.g., N-methylpiperidine, N-ethylpiperidine, etc.), etc. The condensations can be carried out in the presence of an inert diluent (depending somewhat on the solubility of the intermediates in the diluent), such as the lower alcohols (e.g., ethanol, n-propanol, isopropanol, n-butanol, etc.), pyridine, quinoline, isoquinoline, 1,4-dioxane, etc. Basic diluents, such as pyridine, quinoline, isoquinoline, etc., are particularly useful in the condensations between the compounds of Formula IV with those of Formulas III and V. Heat accelerates the condensations. Temperatures varying from ambient (ca. 25° C.) to the reflux temperature of the reaction mixture can be employed.

The following examples will serve to illustrate more fully the manner whereby we practice our invention.

*Example 1.—1,3 - diethyl - 5 - [2,5 - di(1 - ethyl - 2(1H)-naphtho[1,2]thiazolylidene)cyclopentylidene]barbituric acid*

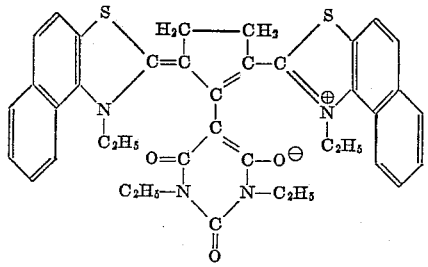

A mixture of 4.61 g. (1 mol.) of 1,3-diethyl-5-[2-(1-ethyl - 2(1H) - naphtho[1,2]thiazolylidene)cyclopentylidene]barbituric acid, 7.98 g. (1 mol. plus 100% excess) of 1-ethyl-2-ethylmercaptonaphtho[1,2]thiazolium ethylsulfate, 30 ml. of dry pyridine and 2.02 g. (1 mol. plus 100% excess) of triethylamine was heated at the refluxing temperature for 30 minutes. The cool reaction mixture was stirred with cold water and the whole was chilled. The solid was collected on a filter and washed with water. The residue was transferred to a beaker, stirred with hot methyl alcohol and the suspension was chilled. The dye was collected on a filter and washed with methyl alcohol. The crude dye was extracted with 185 ml. of ethyl alcohol. The remaining residue was recrystallized from pyridine. The yield of twice recrystallized dye was 21%. The minute coppery needles had M.P. 242–243° C. with decomposition, and they sensitized a photographic gelatino-silver-bromoiodide emulsion from about 530 mμ to about 740 mμ with maximum sensitivity at about 700 mμ.

*Example 2.—1,3 - diethyl - 5 - [2,5 - di(1 - ethyl-2(1H)-naphtho[1,2]thiazolylidene)cyclopentylidene] - 2-thiobarbituric acid*

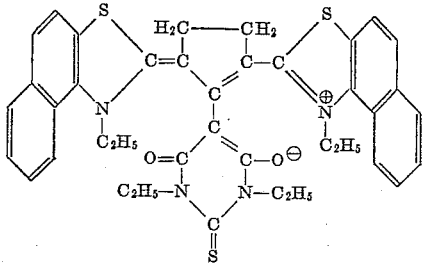

A mixture of 2.36 g. (1 mol.) of 1,3-diethyl-5-[2-(1-ethyl - 2(1H) - naphtho[1,2]thiazolylidene)cyclopentylidene]-2-thiobarbituric acid, 3.99 g. (1 mol. plus 100% excess) of 1-ethyl-2-ethylmercaptonaphtho[1,2]thiazolium ethylsulfate, 10 ml. of isoquinoline and 1.01 g. (1 mol. plus 100% excess) of triethylamine was heated in an oil bath at about 130° C. for 10 minutes. The cool reaction mixture was stirred with ether, chilled, filtered and the residue was washed with ether. The solid was transferred to a beaker and stirred with hot methyl alcohol. After chilling, the suspension was filtered. The yield of dye was 19% crude and 10% after two purifications, each of which consisted of dissolving the crystals in pyridine, filtering the solution and adding methyl alcohol to the filtrate. The coppery needles had M.P. 244–245° C. with decomposition and they sensitized a photographic gelatino-silver-bromoiodide emulsion with maximum sensitivity at about 700 mμ.

*Example 3.—3 - ethyl - 5 - [2,5 - di(3 - methyl-2(3H)-benzothiazolylidene)cyclopentylidene]rhodanine*

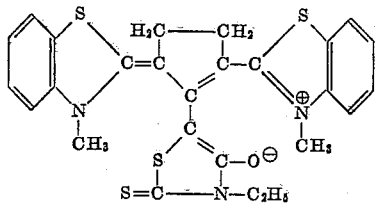

A mixture of 3.74 g. (1 mol.) of 3-ethyl-5-[2-(3-methyl - 2(3H) - benzothiazolylidene)cyclopentylidene]-rhodanine, 7.34 g. (1 mol. plus 100% excess) of 3-methyl-2-methylmercaptobenzothiazolium p-toluenesulfonate, 30 ml. of dry pyridine and 2.02 g. (1 mol. plus 100% excess) of triethylamine was heated at the refluxing temperature for 30 minutes. The cool reaction mixture was stirred with cold water and the whole was chilled. The product was collected on a filter and washed with water. The residue was transferred to a beaker, stirred with hot methyl alcohol and the suspension was chilled. The solid was collected on a filter and washed with methyl alcohol. The crude dye was dissolved in 45 ml. of hot pyridine, filtered and 80 ml. of hot methyl alcohol was added to the filtrate. After chilling, the solid was collected on a filter and then it was recrystallized from pyridine. The first and second crops were combined and extracted with several portions of hot ligroin (B.P. 100–110° C.). After further recrystallizations and extractions with both hot benzene and hot ligroin the final portion of dye weighed 0.56 g. and the dark green crystals with a brassy reflex had M.P. 286–287° C. with decomposition.

*Example 4.—1,3 - diethyl - 5 - [2,5 - di(3-methyl-2(3H)-benzothiazolylidene)cyclopentylidene]barbituric acid*

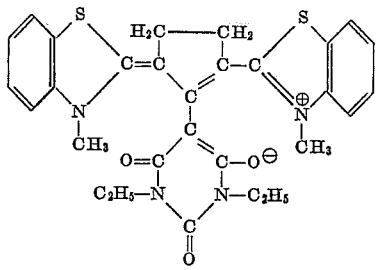

A mixture of 3.97 g. (1 mol.) of 1,3-diethyl-5-[2-(3-methyl - 2(3H) - benzothiazolylidene)cyclopentylidene]-barbituric acid, 7.34 g. (1 mol. plus 100% excess) of 3-methyl-2-methylmercaptobenzothiazolium p-toluenesulfonate, 20 ml. of dry pyridine and 2.02 g. (1 mol. plus 100% excess) of triethylamine was heated at the refluxing temperature for 30 minutes. The cool reaction mixture was stirred with cold water and the whole was chilled. The solid was collected on a filter and washed with water. The residue was transferred to a beaker, stirred with hot methyl alcohol and the suspension was chilled. The dye was collected on a filter and washed with methyl alcohol. The yield of dye was 59% crude and 26% after two recrystallizations from ethyl alcohol. The dull bronze crystals had M.P. 298–299° C. with decomposition, and they sensitized a photographic gelatino-silver-bromoiodide emulsion from about 590 mμ to about 680 mμ with maximum sensitivity at about 650 mμ.

1,3 - diethyl - 5 - [2,5 - di(3 - ethyl - 2(3H) - benzothiazolylidene)cyclopentylidene]barbituric acid was prepared, in like manner, from 1,3-diethyl-5-[2-(3-ethyl-2(3H) - benzothiazolylidene)cyclopentylidene]barbituric acid and 3-ethyl-2-ethylmercaptobenzothiazolium ethylsulfate. The yield of dye was 22% crude and 9% after two recrystallizations from ethyl alcohol. The orange crystals had M.P. 296–298° C. with decomposition and they sensitized a photographic gelatino-silver-bromoiodide emulsion with maximum sensitivity at about 650 mμ.

*Example 5.—1,3 - diethyl - 5 - [2,5 - di(3 - methyl - 2-(3H) - benzoxazolylidene)cyclopentylidene]barbituric acid*

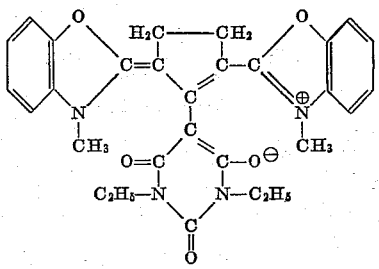

A mixture of 4.67 g. (1 mol. plus 300% excess) of 2-methylmercaptobenzoxazole and 5.27 g. (1 mol. plus 300% excess) of methyl p-toluenesulfonate was heated over a free flame until bubbles appeared and then the reaction mixture was stood at room temperature. The resulting quaternary salt, 2.70 g. (1 mol.) of 1,3-diethyl-5 - [2 - (3 - methyl - 2(3H) - benzoxazolylidene)cyclopentylidene]barbituric acid, 15 ml. of dry pyridine and 2.86 g. (1 mol. plus 300% excess) of triethylamine were heated together at the refluxing temperature for 7 minutes. The cool reaction mixture was stirred with cold water. After chilling, the mixture was filtered and the residue was washed with water. The combined aqueous mother liquors and washings was stirred with an equal volume of ether and the whole chilled overnight. The small amount of dye was collected on a filter, washed with ether and then recrystallized from benzene. The dark green crystals (0.05 g.) had M.P. 236–237° C. with decomposition.

*Example 6.—1 - dicyanomethylene - 2,5 - di(3 - methyl-2(3H)-benzothiazolylidene)cyclopentane*

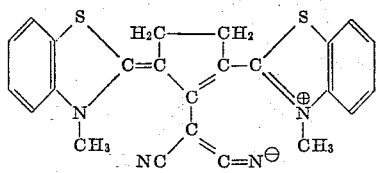

A mixture of 1.86 g. (1 mol.) of 1-dicyanomethylene-2 - (3 - methyl - 2(3H) - benzothiazolylidene)cyclopentane, 3.67 g. (1 mol. plus 50% excess) of 3-methyl-2-methylmercaptobenzothiazolium p-toluenesulfonate, 15 ml. of dry pyridine and 1.01 g. (1 mol. plus 50% excess) of triethylamine was heated at the refluxing temperature for 20 minutes. The cool reaction mixture was stirred with cold water and ether. After chilling, the solid was collected on a filter and washed with water. The residue was transferred to a beaker and stirred with hot methyl alcohol. After chilling, the suspension was filtered. The residue was suspended in hot methyl alcohol and filtered hot. This treatment was continued until all of the unchanged starting material had been removed. The yield of product was 23% crude and 14% after two purifications, each of which consisted of dissolving the crystals in hot pyridine, filtering the solution and adding hot methyl alcohol to the filtrate. The green crystals had M.P. 309–311° C. with decomposition and they sensitized a photographic gelatino-silver-bromoiodide emulsion from about 590 mμ to about 680 mμ with maximum sensitivity at about 665 mμ.

1 - dicyanomethylene - 2 - (3 - ethyl - 2(3H) - benzothiazolylidene) - 5 - (3 - methyl - 2(3H) - benzothiazolylidene)cyclopentane was prepared, in like manner, by using 3-ethyl-2-ethylmercaptobenzothiazolium ethylsulfate in place of the 3-methyl-2-methylmercaptobenzothiazolium p-toluenesulfonate in the above example. The yield of product was 14% crude and 7% after two purifications, each of which consisted of dissolving the crystals in hot pyridine, filtering the solution and adding hot methyl alcohol to the filtrate. The green crystals had M.P. 280–283° C. with decomposition and they sensitized a photographic gelatino-silver-bromoiodide emulsion with maximum sensitivity at about 600 mμ.

In a similar manner, 1-dicyanomethylene-2,5-di(3-ethyl-2(3H)-benzothiazolylidene)cyclopentane was prepared from 1.94 g. (1 mol.) of 1-dicyanomethylene-2-(3-ethyl-2(3H)-benzothiazolylidene)cyclopentane, 4.65 g. (1 mol. plus 100% excess) of 3-ethyl-2-ethylmercaptobenzothiazolium ethylsulfate and 1.34 g. (1 mol. plus 100% excess) of triethylamine in 15 ml. of dry pyridine. The yield of dye was 19% crude and 13% after two purifications, each of which consisted of dissolving the crystals in hot pyridine, filtering the solution and adding hot methyl alcohol to the filtrate. The green needles had M.P. 282–284° C. with decomposition and they sensitized a photographic gelatino-silver-bromoiodide emulsion with maximum sensitivity at about 600 mμ.

*Example 7.—1-(1-cyano-1-ethoxycarbonylmethylene)-2,5-di(3-methyl-2(3H)-benzothiazolylidene)cyclopentane*

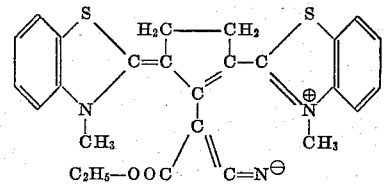

A mixture of 6.52 g. (1 mol.) of 1-(1-cyano-1-ethoxycarbonylmethylene) - 2 - (3 - methyl - 2(3H) - benzothiazolylidene)cyclopentane (Kendall, Suggate and Mayo, British Patent 704,840), 14.68 g. (1 mol. plus 100% excess) of 3-methyl - 2 - methylmercaptobenzothiazolium p-toluenesulfonate, 15 ml. of dry pyridine and 4.04 g. (1 mol. plus 100% excess) of triethylamine was heated at the refluxing temperature for 45 minutes. The cool reaction mixture was stirred with about 1200 ml. of cold water. After chilling, the solid was collected on a filter and washed with water. The residue was transferred to a beaker and stirred with hot methyl alcohol. After chilling, the solid was collected on a filter and washed with methyl alcohol. The residue was suspended in hot methyl alcohol and the suspension was filtered hot. This treatment was repeated until all of the unchanged starting material had been removed. The yield of dye was 38% crude and 30% after two purifications, each of which consisted of dissolving the crystals in pyridine, filtering the solution and adding hot methyl alcohol to the filtrate. The dark green crystals had M.P. 301–302° C. with decomposition and they sensitized a photographic gelatino-silver-bromo-iodide emulsion with maximum sensitivity at about 640 mμ.

*Example 8.—1-dicyanomethylene-2-(3-ethyl-2(3H)-benzothiazolylidene)-5-[(3-ethyl-2(3H)-benzothiazolylidene)ethylidene]cyclopentane*

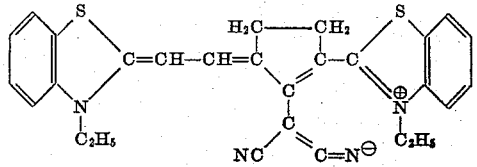

A mixture of 1.60 g. (1 mol.) of 1-dicyanomethylene-2-[(3 - ethyl - 2(3H) - benzothiazolylidene)ethylidene]cyclopentane, 3.49 g. (1 mol. plus 100% excess) of 3-ethyl-2-ethylmercaptobenzothiazolium ethylsulfate, 15 ml. of dry pyridine and 1.01 g. (1 mol. plus 100% excess) of triethylamine was heated at the refluxing temperature for 20 minutes. After chilling, the solid was collected on a filter and washed with methyl alcohol. The residue was transferred to a beaker, stirred with hot methyl alcohol and the suspension was filtered hot. The yield of dye was 72% crude and 30% after three purifications, each of which consisted of dissolving the crystals in pyridine, filtering the solution and adding hot methyl alcohol to the filtrate. The blackish-green crystals had M.P. 278-279° C. with decomposition and they sensitized a photographic gelatino-silver-bromoiodide emulsion with maximum sensitivity at about 640 mµ.

*Example 9.—1-dicyanomethylene-2,5-di[(3-ethyl-2(3H)-benzothiazolylidene)ethylidene]cyclopentane*

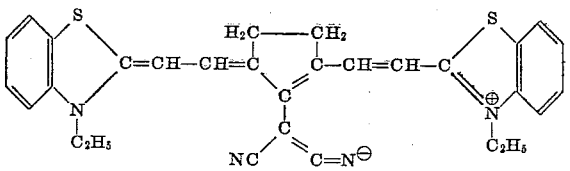

A mixture of 1.60 g. (1 mol.) of 1-dicyanomethylene-2-[(3 - ethyl - 2(3H) - benzothiazolylidene)ethylidene]cyclopentane, 4.50 g. (1 mol. plus 100% excess) of 2-β-acetanilidovinyl-3-ethylbenzothiazolium iodide, 40 ml. of dry pyridine, 1.01 g. (1 mol. plus 100% excess) of triethylamine and 1.02 g. of acetic anhydride was heated at the refluxing temperature for 15 minutes. The reaction mixture was filtered warm and the residue was washed first with pyridine and then with methyl alcohol. The yield of dye was 77% crude and 66% after two recrystallizations from pyridine. The dark blue needles with a green reflex had M.P. 295-296° C. with decomposition and they sensitized a photographic gelatino-silver-bromoiodide emulsion with maximum sensitivity at about 770 mµ.

*Example 10.—1-dicyanomethylene-2,6-di(3-methyl-2(3H)-benzothiazolylidene)cyclohexane*

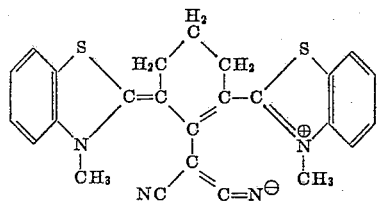

A mixture of 1.47 g. (1 mol.) of 1-dicyanomethylene-2-(3-methyl-2(3H) - benzothiazolylidene)cyclohexane, 3.67 g. (1 mol. plus 100% excess) of 3-methyl-2-methylmercaptobenzothiazolium p-toluenesulfonate, 15 ml. of dry pyridine and 1.01 g. (1 mol. plus 100% excess) of triethylamine was heated at the refluxing temperature for 30 minutes. The cool reaction mixture was stirred with cold water. After chilling, the solid was collected on a filter and washed with water. The residue was transferred to a beaker, stirred with hot methyl alcohol and the whole was chilled. The solid was collected on a filter and the residue was extracted with hot methyl alcohol to remove unchanged starting material. The yield of dye after two recrystallizations from pyridine was 8%. The orange crystals had M.P. above 330° C. and they sensitized a photographic gelatino-silver-bromoiodide emulsion with maximum sensitivity at about 510 mµ.

1-dicyanomethylene - 2 - (3 - ethyl-2(3H)-benzothiazolylidene) - 6 - (3 - methyl-2(3H)-benzothiazolylidene)cyclohexane was prepared in a similar manner by using 3.49 g. (1 mol. plus 100% excess) of 3-ethyl-2-ethylmercaptobenzothiazolium ethylsulfate instead of the 3-methyl-2-methylmercaptobenzothiazolium p-toluenesulfonate in the above example. The gray-green crystals had M.P. 275-277° C. with decomposition and they sensitized a photographic gelatino-silver-bromoiodide emulsion with maximum sensitivity at about 520 mµ.

*Example 11.—1,3-diethyl-5-{2,5-di[(3-ethyl-2(3H)-benzothiazolylidene)ethylidene]cyclopentylidene}barbituric acid*

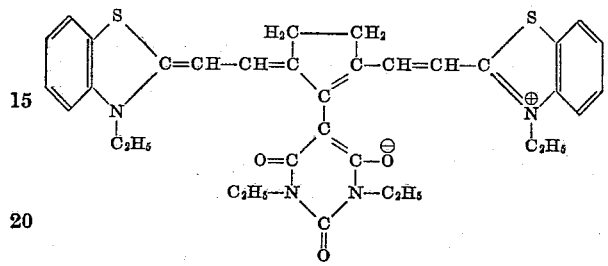

A mixture of 1.25 g. (1 mol.) of 5-cyclopentylidene-1,3-diethylbarbituric acid, 4.50 g. (2 mols.) of 2-β-acetanilidovinyl-3-ethylbenzothiazolium iodide, 50 ml. of absolute ethyl alcohol and 1.01 g. (2 mols.) of triethylamine was heated at the refluxing temperature for 20 minutes. The cool reaction mixture was filtered. The residue was treated with three successive portions of hot methyl alcohol. The remaining residue was extracted with hot pyridine and the undissolved portion was dissolved in 5 ml. of cresol, the solution was filtered and 65 ml. of methyl alcohol was added to the filtrate. After chilling the dye was collected on a filter and washed with methyl alcohol. The yield of dye was 14%. The light green crystals had M.P. 257-258° C. with decomposition.

*Example 12.—1,3-di(β-methoxyethyl)-5-[2,5-di(1-methyl - 2(1H)-naphtho[1,2] - thiazolylidene)cyclopentylidene]-barbituric acid*

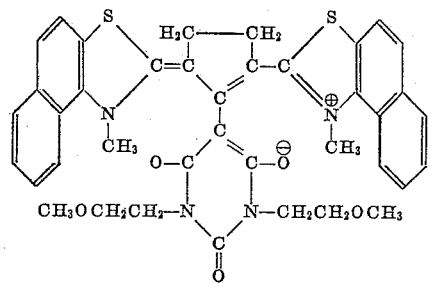

A mixture of 2.54 g. (1 mol.) of 1,3-di(β-methoxyethyl)-5-[2-(1 - methyl - 2(1H) - naphtho[1,2]thiazolylidene)cyclopentylidene]-barbituric acid, 4.17 g. (1 mol. plus 100% excess) of 1-methyl-2-methylmercaptonaphtho[1,2]thiazolium p-toluenesulfonate, 20 ml. of dry pyridine and 1.01 g. (1 mol. plus 100% excess) of triethylamine was heated at the refluxing temperature for 30 minutes. The cool reaction mixture was stirred with cold water and after chilling the aqueous layer was decanted and the residue was washed with water. The remaining residue was stirred with hot methyl alcohol and after cooling the dye was collected on a filter and washed with methyl alcohol. The dye was dissolved in hot pyridine, the solution was filtered and hot methyl alcohol was added to the hot filtrate. The dye was collected on a filter and washed with methyl alcohol. After another such purification, the yield of dye was 26%. The coppery needles had M.P. 268-269° C. with decomposition and they sensitized a photographic gelatino-silver-bromoiodide emulsion to about 760 mµ with maximum sensitivity at about 730 mµ.

*Example 13.*—*4[2,5-di(1 - methyl-2(1H)-naphtho[1,2]-thiazolylidene) - cyclopentylidene]-3 - phenyl-5(4H)-isoxazolone*

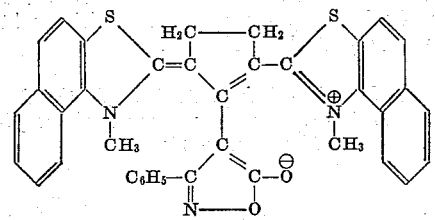

A mixture of 2.12 g. (1 mol.) of 4-[2-(1-methyl-2(1H) - naphtho[1,2]thiazolylidene)cyclopentylidene-3-phenyl-5(4H)-isoxazolone, 4.17 g. (1 mol. plus 100% excess) of 1-methyl-2-methylmercaptonaphtho[1,2]thiazolium p-toluenesulfonate, 15 ml. of isoquinoline and 1.01 g. (1 mol. plus 100% excess) of triethylamine was heated in an oil-bath at 140–150° C. for 15 minutes. The cool reaction mixture was stirred with ether and after chilling the ether-isoquinoline layer was decanted and the residue was washed with ether. The remaining residue was stirred with hot methyl alcohol and after chilling the dye was collected on a filter. The yield of dye after two recrystallizations from pyridine was 20%. The blackish-green crystals had M.P. 253–255° C. with decomposition and they sensitized a photographic gelatino-silver-bromoiodide emulsion to about 765 mμ with maximum sensitivity at about 730 mμ.

*Example 14.*—*2-[2-(1-ethyl - 2(1H) - naphtho[1,2]thiazolylidene)-5-(3-methyl-2(3H) - benzothiazolylidene)-cyclopentylidene]-3(2H)-thianaphthenone-1,1-dioxide*

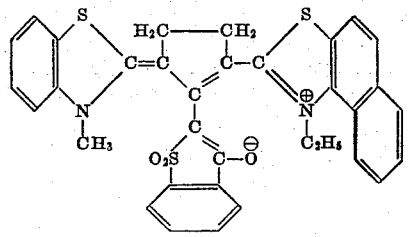

A mixture of 2.30 g. (1 mol.) of 2-[2-(1-ethyl-2(1H)-naphtho[1,2]thiazolylidene)cyclopentylidene] - 3(2H)-thianaphthenone-1,1-dioxide, 3.67 g. (1 mol. plus 100% excess) of 3-methyl-2-methylmercaptobenzothiazolium p-toluenesulfonate, 20 ml. of isoquinoline and 1.01 g. (1 mol. plus 100% excess) of triethylamine was heated in an oil bath at 130–145° C. for 45 minutes. The cool reaction mixture was stirred with ether and after chilling the ether-isoquinoline layer was decanted and the residue was washed with ether. The remaining portion was stirred with hot methyl alcohol and after chilling the dye was collected on a filter and washed with methyl alcohol. The dye was dissolved in hot pyridine, the solution was filtered, methyl alcohol was added to the filtrate, and after chilling the dye was collected on a filter and washed with methyl alcohol. The yield of dye was 17%. The dull coppery crystals had M.P. 249–250° C. with decomposition.

*Example 15.*—*1,3-diethyl-5-[2-(1 - ethyl-2(1H)-naphtho[1,2]thiazolylidene)-5-(3 - methyl-2(3H) - benzothiazolylidene)cyclopentylidene]barbituric acid*

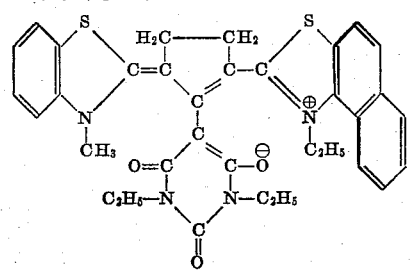

A mixture of 2.31 g. (1 mol.) of 1,3-diethyl-5-[2-(1-ethyl-2(1H) - naphtho[1,2]thiazolylidene)cyclopentylidene]barbituric acid, 3.67 g. (1 mol. plus 100% excess) of 3-methyl-2-methylmercaptobenzothiazolium p-toluenesulfonate, 20 ml. of pyridine and 1.01 g. (1 mol. plus 100% excess) of triethylamine was heated at the refluxing temperature for 30 minutes. The cool reaction mixture was stirred with water and after chilling the aqueous-pyridine layer was decanted and the residue stirred with several successive portions of cold water. The remaining residue was stirred with hot methyl alcohol and after chilling the dye was collected on a filter and washed with methyl alcohol. The dye was dissolved in hot pyridine, the solution was filtered, methyl alcohol was added to the filtrate and after chilling the dye was collected on a filter and washed with methyl alcohol. After another such purification the yield of dye was 10%. The coppery crystals had M.P. 245–247° C. with decomposition and they sensitized a photographic gelatino-silver-bromoiodide emulsion from about 600 to 700 mμ with maximum sensitivity at about 680 mμ.

*Example 16.*—*1,3-diethyl-5-[2-(1-ethyl-2(1H)-naphtho[1,2]thiazolylidene)-5-(3-ethyl-2(3H) - naphtho[2,1]thiazolylidene)-cyclopentylidene]barbituric acid*

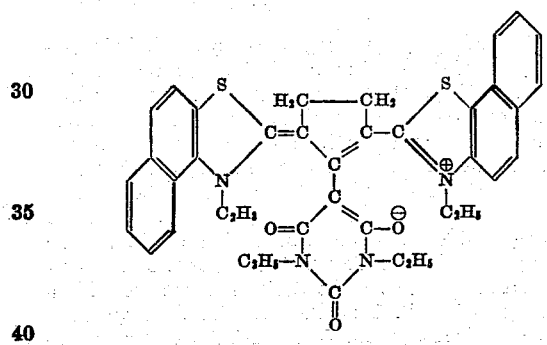

A mixture of 2.31 g. (1 mol.) of 1,3-diethyl-5-[2-(1-ethyl-2(1H) - naphtho[1,2]thiazolylidene)cyclopentylidene]barbituric acid, 4.01 g. (1 mol. plus 100% excess) of 3-ethyl-2-ethylmercaptonaphtho[2,1]thiazolium iodide, 25 ml. of pyridine and 1.01 g. (1 mol. plus 100% excess) of triethylamine was heated at the refluxing temperature for 17 minutes. The cool reaction mixture was stirred with water, chilled and filtered. The residue was treated with successive portions of warm water. The remaining residue was stirred with hot methyl alcohol and filtered. The dye was dissolved in hot pyridine, the hot solution was filtered, methyl alcohol was added to the filtrate and after chilling the dye was collected on a filter and washed with methyl alcohol. The yield of dye was 3%. The coppery crystals had M.P. 257–258° C. with decomposition and they sensitized a photographic gelatino-silver-bromoiodide emulsion from about 580 to 720 mμ with maximum sensitivity at about 690 mμ.

*Example 17.*—*1,3-diethyl-5-[2-(1-ethyl-2(1H)-naphtho[1,2]thiazolylidene)-5-(1 - methyl - 2(1H) - naphtho[1,2]selenazolylidene)-cyclopentylidene]barbituric acid*

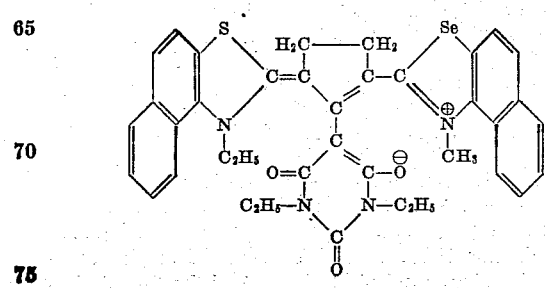

A mixture of 2.31 g. (1 mol.) of 1,3-diethyl-5-[2-(1-ethyl-2(1H)-naphtho[1,2]thiazolylidene)cyclopentylidene]barbituric acid, 2.32 g. (1 mol.) of 1-methyl-2-methylmercaptonaphtho[1,2]selenazolium p-toluenesulfonate, 25 ml. of pyridine and 0.53 g. (1 mol. plus 5% excess) of triethylamine was heated at the refluxing temperature for 5 minutes. The cool reaction mixture was stirred with cold water, and after chilling the solid was collected on a filter and washed with water. The residue was stirred with hot methyl alcohol and after chilling the dye was collected on a filter and washed with methyl alcohol. The dye was dissolved in hot pyridine, the solution was filtered, methyl alcohol was added and after chilling the dye was collected on a filter and washed with methyl alcohol. After another such purification the yield of dye was 17%. The purplish crystals had M.P. 261–262° C. with decomposition and they sensitized a photographic gelatino-silver-bromoiodide emulsion to about 740 m$\mu$ with maxima sensitivity at about 550 and 690 m$\mu$.

*Example 18.—4 - [2,5 - di(3 - ethyl - 2(3H)-benzothiazolylidene)cyclopentylidene] - 3 - methyl-1-phenyl-5-pyrazolone*

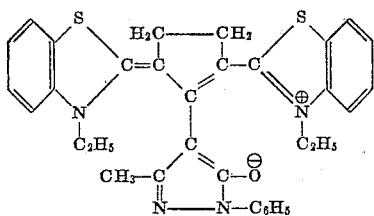

A mixture of 2.5 g. (1 mol.) of 4-[2-(3-ethyl-2(3H)-benzothiazolylidene)cyclopentylidene] - 3 - methyl-1-phenyl-5-pyrazolone, 8.7 g. (1 mol. plus 300% excess) of 3-ethyl-2-ethyl-mercaptobenzothiazolium ethylsulfate, 20 ml. of pyridine and 2.52 g. (1 mol. plus 300% excess) of triethylamine was heated at the refluxing temperature for 15 minutes. The cool reaction mixture was stirred with 300 ml. of ether and the whole chilled. The ether-pyridine layer was decanted and the residue was washed with several successive portions of ether, then with water and finally with four more portions of ether. The residue was stirred with successive portions of ethyl acetate and the ethyl acetate washings were combined and treated with ether. The solid thus obtained and the residue remaining after the treatments with ethyl acetate were combined and extracted a few times with successive portions of benzene. The final residue was dissolved in ethyl acetate. Crystals did not separate from the chilled ethyl acetate solution. As the solution was concentrated green crystals did separate and the suspension was filtered hot. These crystals had M.P. 275–276° C. with decomposition.

We have also found that the new dyes of our invention represented by Formula II above can be hydrolyzed in the presence of a strong mineral acid, such as sulfuric acid, phosphoric acid, etc., and water to provide dyes containing a reactive methyl group in the 1-position of the cyclopentene ring. The following example will serve to illustrate this method.

*Example 19.—8,10 - ethylene - 3,3',9 - trimethylthiacarbocyanine bromine*

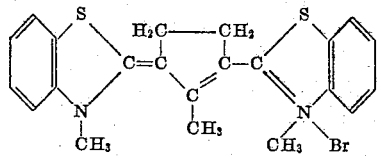

A solution of 0.65 g. of 1-(1-cyano-1-ethoxycarbonylmethylene) - 2,5 - di(3 - methyl - 2(3H) - benzothiazolylidene)cyclopentane in a mixture of 7.0 g. of concentrated sulfuric acid and 3.0 g. of water was heated at the temperature of the steam bath for 30 minutes. After adding an excess of ice and ammonium hydroxide to the reaction mixture, the solid was collected on a filter and washed with water. The residue was stirred with methyl alcohol and filtered. The filtrate was treated with an excess of aqueous potassium bromide. After chilling, the solid was collected on a filter and the residue was first washed with water and then ether. The yield of dye was 17% after two recrystallizations from ethyl alcohol. The dark green crystals had M.P. 225–226° C. with decomposition.

The identical dye was obtained, in like manner, from 1-dicyanomethylene-2,5-di(3-methyl - 2(3H) - benzothiazolylidene)cyclopentane.

It is to be noted that the dyes of our invention represented by Formulas I and II have been named in their uncharged state, although the formulas have been written in the charged form. Thus, the dyes of Formula I can alternatively be written in the following form:

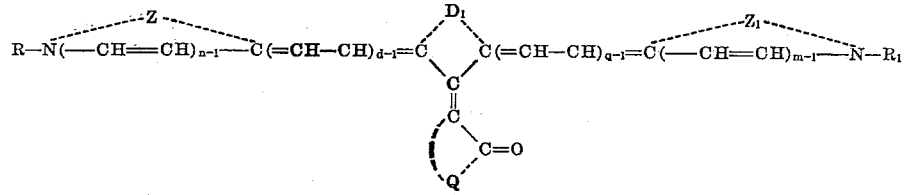

wherein R, $R_1$, d, m, n, q, $D_1$, Q, Z and $Z_1$ each have the values given above. Similarly, the dyes of Formula II above can be written in their uncharged form.

As shown in the above examples, many of the dyes of our invention are particularly useful in manufacturing photographic, silver halide emulsions, serving to alter the sensitivity thereof. Sensitization by means of our new dyes is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver-chorobromide, gelatino-silver-bromide, and gelatino-silver-bromiodide developing-out emulsions.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds, such as palladium chloride (U.S. 2,540,086), potassium choropalladate (U.S. 2,598,079), etc., or mixtures of such sensitizers; antifoggants, such as ammonium chloroplatinate (U.S. 2,566,245), ammonium chloroplatinite (U.S. 2,566,-263), benzotriazole, nitrobenzimidazole, 5-nitroindazole, benzidine, mercaptans, etc. (see Mees, "The Theory of the Photographic Process," Macmillan Pub., 1942, page 460), or mixtures thereof; hardeners, such as formaldehyde (U.S. 1,763,533), chrome alum (U.S. 1,763,533), glyoxal (U.S. 1,870,354), dibromacrolein (British 406,-750), etc.; color couplers, such as those described in U.S. Patent 2,423,730, Spence and Carroll U.S. Patent 2,640,776, etc.; or mixtures of such addenda. Dispersing agents for color couplers, such as those set forth in U.S. Patents 2,322,027 and 2,304,940, can also be employed in the above-described emulsions.

The accompanying drawing further illustrates our invention. Each figure is a diagrammatic reproduction of a spectrogram showing the sensitivity of an ordinary gelatino-silver-halide emulsion sensitized with one of our new holopolar cyanine dyes.

In Fig. 1, the solid curve depicts the sensitivity of an ordinary gelatino-silver-bromiodide emulsion containing 1,3 - diethyl - 5 - [2,5 - di(1 - ethyl - 2(1H) - naphtho[1,2]thiazolylidene)-cyclopentylidene]barbituric acid. The preparation of this dye is described above in Example 1.

In Fig. 2, the solid curve represents the sensitivity of an ordinary gelatino-silver-bromiodide emulsion containing 1 - dicyanomethylene - 2,5 - di(3 - methyl - 2(3H)-benzothiazolylidene)-cyclopentane. The preparation of this dye is illustrated above in Example 6.

In Fig. 3, the solid curve represents the sensitivity of an ordinary gelatino-silver-bromiodide emulsion containing 4 - [2,5 - di(1 - methyl - 2(1H) - naphtho[1,2]thiazolylidene)cyclopentylidene] - 3 - phenyl - 2 - isoxazolin-5-one. The preparation of this dye is described above in Example 13.

What we claim as our invention and desire secured by Letters Patent of the United States is:

1. A photographic silver halide emulsion sensitized with a cyanine dye selected from those represented by the following two general formulas:

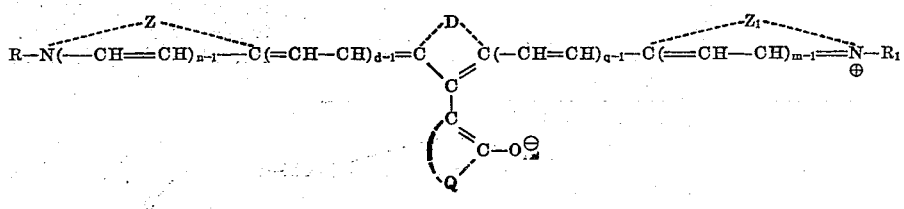

and

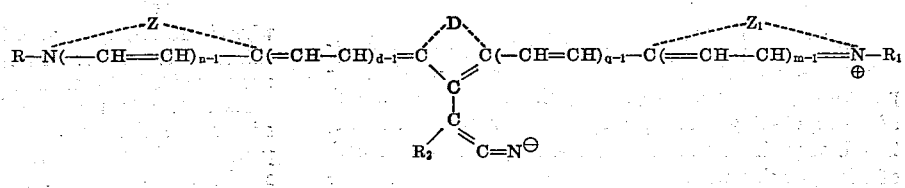

wherein R and $R_1$ each represents a member selected from the class consisting of a hydrocarbon alkyl group containing from 1 to 5 carbon atoms, a β-methoxyethyl group, a β-ethoxyethyl group, an allyl group, a benzyl group, a β-phenylethyl group, and a carboxymethyl group, $R_2$ represents a member selected from the group consisting of a cyano group and an alkoxycarbonyl group, d, m, n and q each represents a positive integer of from 1 to 2, D represents the atoms necessary to complete a cycloalkene ring containing from 5 to 6 carbon atoms, Q represents the non-metallic atoms necessary to complete a nucleus selected from the group consisting of those of the pyrazole series, those of the isoxazolone series, those of the 2,4,6-triketohexahydropyrimidine series, those of the rhodanine series, those of the 2-thio-2,4-oxazolidinedione series, and those of the 2-thiohydantoin series, and Z and $Z_1$ each represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series, those of the 2-quinoline series and those of the 4-quinoline series.

2. A photographic gelatino-silver-halide emulsion sensitized with the cyanine dye represented by the following formula:

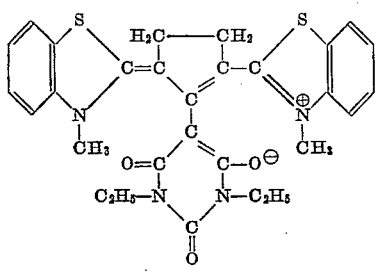

3. A photographic gelatino-silver-halide emulsion sensitized with the cyanine dye represented by the following formula:

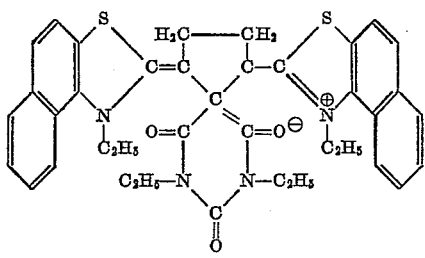

4. A photographic gelatino-silver-halide emulsion sensitized with the cyanine dye represented by the following formula:

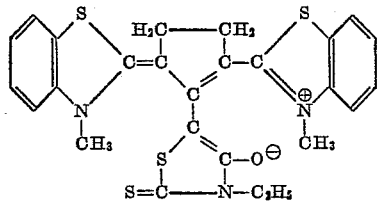

5. A photographic gelatino-silver-halide emulsion sensitized with the cyanine dye represented by the following formula:

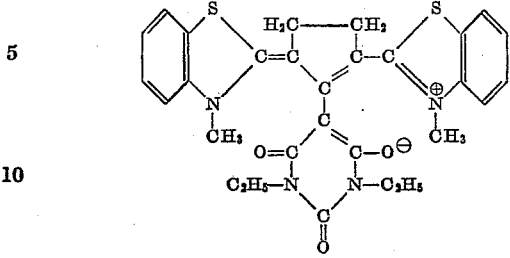

6. A photographic gelatino-silver-halide emulsion sensitized with the cyanine dye represented by the following formula:

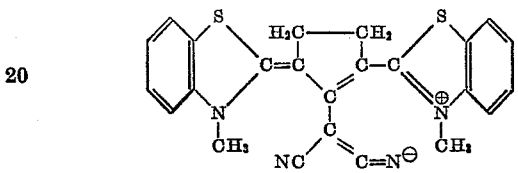

References Cited in the file of this patent
UNITED STATES PATENTS

| | | |
|---|---|---|
| 2,191,810 | Stevens | Feb. 27, 1940 |
| 2,395,879 | Kendall et al. | Mar. 5, 1946 |
| 2,450,390 | Anish | Sept. 28, 1948 |
| 2,471,996 | Anish | May 31, 1949 |
| 2,474,426 | Kendall et al. | June 28, 1949 |
| 2,505,496 | Kendall et al. | Apr. 25, 1950 |
| 2,739,964 | Brooker et al. | Mar. 27, 1956 |

FOREIGN PATENTS

| | | |
|---|---|---|
| 483,045 | Great Britain | Apr. 7, 1938 |

OTHER REFERENCES

Degering: "Organic Chemistry," 6th ed., page 26, Barnes & Noble, Inc., N.Y., 1951 ("College Outline Series").

Chemical Abstracts 16, 3101 (Abstract of Brit. Med. Journal, 1922, I, 514–5).

Chemical Abstracts 19, 530 (Abstract of Proc. Roy. Soc., London 96B, 317–33, 1924).

UNITED STATES PATENT OFFICE
CERTIFICATION OF CORRECTION

Patent No. 2,955,939                                    October 11, 1960

Leslie G. S. Brooker et al.

It is hereby certified that error appears in the above numbered patent requiring correction and that the said Letters Patent should read as corrected below.

Column 2, line 16, for "-2,4-oxazolidinedione" read -- -2,5-thiazolidinedione --; column 4, line 15, for "toyly" read -- tolyl --; column 12, lines 30 to 37, the left-hand portion of the formula should appear as shown below instead of as in the patent:

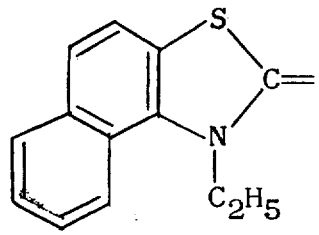

column 16, line 63, for "pyrazole" read -- pyrazolone --; column 18, lines 3 to 9, the upper portion of the formula should appear as shown below instead of as in the patent:

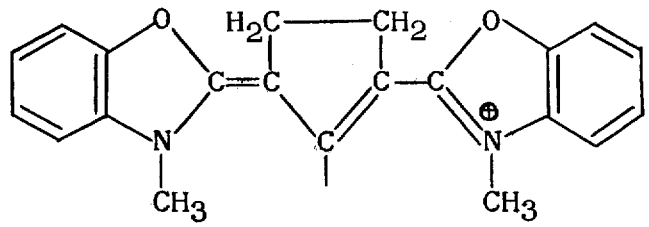

Signed and sealed this 23rd day of May 1961.

(SEAL)
Attest:

ERNEST W. SWIDER                                  DAVID L. LADD
Attesting Officer                                Commissioner of Patents